(12) United States Patent
Wojtunik

(10) Patent No.: US 12,191,049 B2
(45) Date of Patent: Jan. 7, 2025

(54) RADIO FREQUENCY WIRE ASSEMBLY CONFIGURED TO WITHSTAND HIGH TEMPERATURES

(71) Applicant: Henry Wojtunik, Holmdel, NJ (US)

(72) Inventor: Henry Wojtunik, Holmdel, NJ (US)

( * ) Notice: Subject to any disclaimer, the term of this patent is extended or adjusted under 35 U.S.C. 154(b) by 462 days.

(21) Appl. No.: 17/709,515

(22) Filed: Mar. 31, 2022

(65) Prior Publication Data

US 2022/0319739 A1  Oct. 6, 2022

Related U.S. Application Data

(60) Provisional application No. 63/168,773, filed on Mar. 31, 2021.

(51) Int. Cl.
| | | |
|---|---|---|
| H01B 1/02 | (2006.01) | |
| H01B 11/00 | (2006.01) | |
| H01B 11/18 | (2006.01) | |

(52) U.S. Cl.
CPC ............ H01B 11/002 (2013.01); H01B 1/02 (2013.01); H01B 11/1873 (2013.01)

(58) Field of Classification Search
CPC ...... H01B 11/002; H01B 11/1873; H01B 1/02
See application file for complete search history.

(56) References Cited

U.S. PATENT DOCUMENTS

| | | | | |
|---|---|---|---|---|
| 5,245,134 A * | 9/1993 | Vana, Jr. | ............... | H01B 11/203 385/112 |
| 5,521,360 A * | 5/1996 | Johnson | ................. | H05B 6/705 219/709 |
| 5,712,468 A * | 1/1998 | Ace | ........................ | H05B 6/6444 219/758 |
| 5,751,895 A * | 5/1998 | Bridges | ................... | E21B 47/13 392/306 |
| 8,496,184 B2 * | 7/2013 | Loi | .......................... | H01Q 1/38 235/487 |
| 9,880,045 B2 * | 1/2018 | Hanson | ................ | G01G 19/024 |
| 10,006,799 B2 * | 6/2018 | Hanson | ................ | G01G 19/024 |
| 2003/0028095 A1 * | 2/2003 | Tulley | .................. | G01R 33/287 600/422 |
| 2004/0244386 A1 * | 12/2004 | Penn | ........................ | H01F 6/04 62/50.2 |
| 2006/0089637 A1 * | 4/2006 | Werneth | ................. | A61B 18/16 606/41 |
| 2011/0301450 A1 * | 12/2011 | Hue | ........................ | A61B 18/14 600/411 |
| 2012/0018524 A1 * | 1/2012 | Loi | .......................... | H01Q 9/30 235/492 |

(Continued)

*Primary Examiner* — Hai V Nguyen
(74) *Attorney, Agent, or Firm* — Volpe Koenig

(57) ABSTRACT

A wire assembly and antenna that is configured to transmit and receive radio frequency signals and can withstand high temperatures is disclosed. The wire assembly includes a first and second wire formed from copper, steel, copper coated steel, or metallic alloy, and the wires are spaced apart from each other by a predetermined distance. This predetermined distance is maintained via applying tension to the wires and/or using separator nodes or other spacing elements. Various components of the system disclosed herein are formed from fire proof or fire resistant materials, such that the components will not fail or be compromised under extreme heat and flames.

20 Claims, 14 Drawing Sheets

(56) References Cited

U.S. PATENT DOCUMENTS

| | | | |
|---|---|---|---|
| 2012/0265190 A1* | 10/2012 | Curley | F04B 41/02 |
| | | | 29/600 |
| 2016/0042835 A1* | 2/2016 | Lustig | H01R 13/6592 |
| | | | 174/105 R |
| 2016/0365165 A1* | 12/2016 | Jo | H01B 1/026 |
| 2018/0156655 A1* | 6/2018 | Hanson | G01L 1/14 |
| 2021/0051805 A1* | 2/2021 | Pevzner | H05K 3/103 |
| 2022/0223319 A1* | 7/2022 | McNutt | H01B 1/02 |
| 2022/0231466 A1* | 7/2022 | Islam | H01B 7/185 |
| 2022/0406487 A1* | 12/2022 | Tanaka | B60T 8/34 |
| 2023/0008754 A1* | 1/2023 | Tanaka | H10N 60/81 |

* cited by examiner

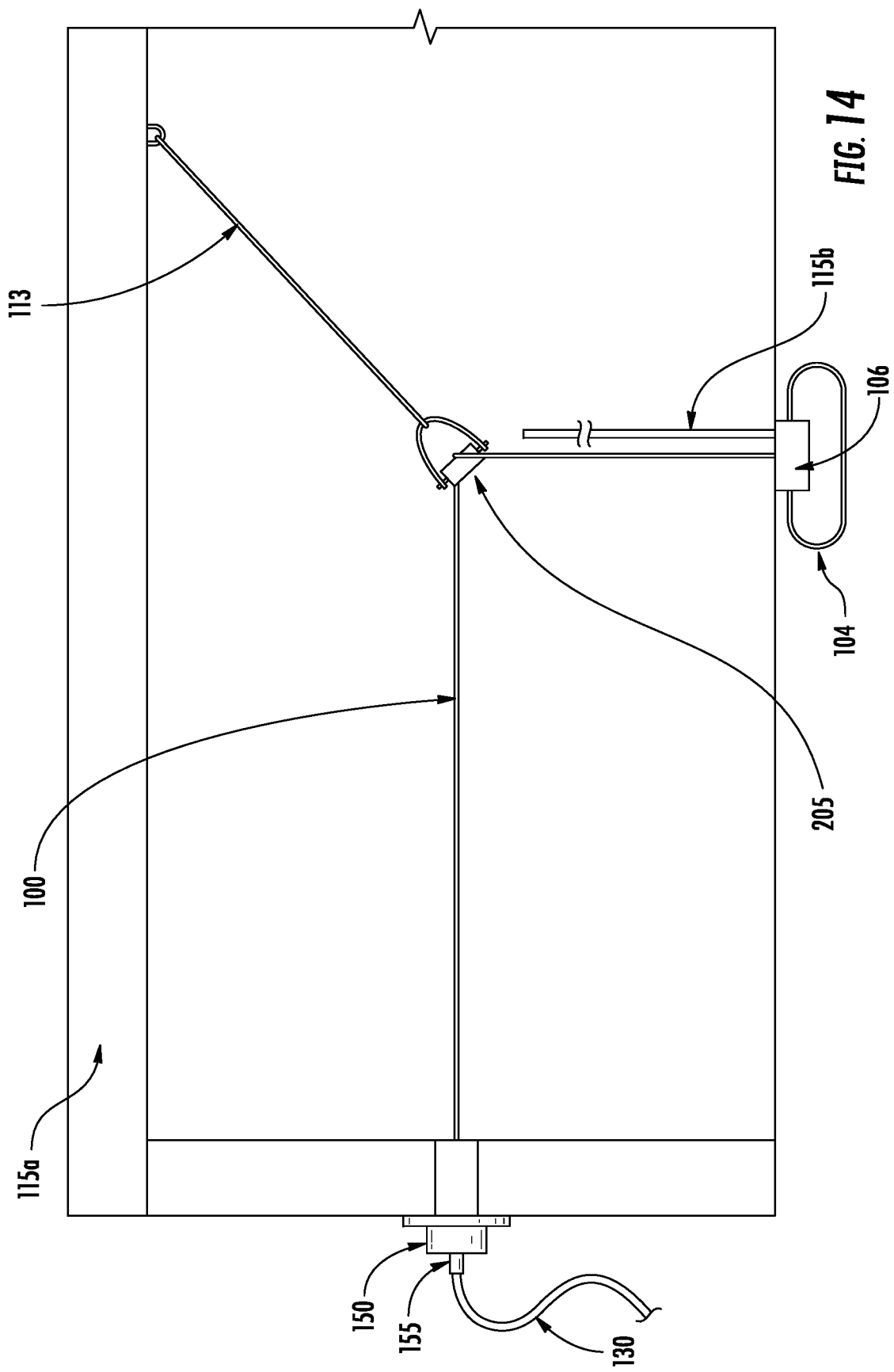

RADIO FREQUENCY WIRE ASSEMBLY CONFIGURED TO WITHSTAND HIGH TEMPERATURES

INCORPORATION BY REFERENCE

This application claims priority to U.S. Provisional Patent Application No. 63/168,773, which was filed on Mar. 31, 2021, and is incorporated herein by reference in its entirety.

BACKGROUND

Wireless radio communications are used inside buildings to coordinate responses by first-responders, local security, and facility personnel. The wireless infrastructure that distributes the wireless radio signal throughout buildings is susceptible to the high temperatures that can occur during structural fires.

One of the components of an in-building wireless infrastructure are radio frequency cables and antennas for distributing the radio frequency (RF) signals used by emergency personnel. When these components fail due to the high temperature of the fire, the radio communication system fails and emergency personnel cannot coordinate their life-saving activities, thereby putting the public and themselves at much greater risk.

Multiple issues are encountered by existing systems. For example, existing RF cables and antennas may be capable of withstanding roughly two hours of 1850° F. temperatures but cannot carry the high frequency signals required of modern wireless radio communications systems in use today. Additionally, existing RF cables and antennas may be capable of carrying RF signals but cannot withstand the intense temperatures and lose their ability to transport and radiate the radio frequency signal. Finally, existing configurations may include a cable or wire that is capable of withstanding high temperatures, but the connectors and antenna are not capable of withstanding high temperatures.

Accordingly, a need exists for an innovative solution that considers the materials, mechanical assembly, configuration, and installation techniques that ensures continued operation of communication wires and cables under intense heat.

SUMMARY

A radio frequency wire system is disclosed herein that is designed to withstand fires and high temperatures such that communications can be transmitted in emergency situations. Each of the components of the system are configured to be durable and reliable in the event of a fire. The system includes a dual wire assembly including a first wire and a second wire. The first and second wires can be formed from at least one of copper, steel, copper coated steel, or a metallic alloy. The dual wire assembly is configured to transmit radio frequency signals. At least one separator node can be configured to separate the first wire and the second wire by a predetermined distance. The at least one separator node can be formed from at least one of furnace concrete, low coefficient of expansion glass, or silica cement. As used in this context, the term "low coefficient of expansion" with respect to a glass material means a material that has a low expansion and contraction response over a wide temperature range. The glass material can withstand high temperatures. Some examples of low efficient of expansion of glass can include COE33 glass (i.e. glass with a coefficient of expansion of 33).

The dual wire assembly can be configured to be connected to at least one antenna at a first end and the dual wire assembly can be configured to be connected to communication equipment at a second end.

At least one pivot node can be provided that includes at least one anchor configured to secure the pivot node to a support structure. The anchor can include any protrusion extending from the pivot node and configured to engage with a tensioning element, such as a cable. The anchor can include a screw, in one example. The pivot node can include at least one notch configured to receive a portion of the dual wire assembly. The pivot node can include two anchors on opposite sides of the pivot node.

The at least one anchor can include at least one of a tension spring, a turnbuckle, or a hook. Using these components, the tautness or tension of the dual wire assembly can be adjusted.

The at least one notch can include a first pair of notches on a first edge of the pivot node, and a second pair of notches on a second edge of the pivot node.

The notches of the first pair of notches can be spaced apart from each other by the predetermined distance, and the notches of the second pair of notches can be spaced apart from each other by the predetermined distance. The first pair of notches, and the second pair of notches can be situated such that they are offset from each other.

At least one antenna can be integrated within the system. The antenna can be formed from copper coated steel, and can be formed as a folded dipole antenna.

The antenna can be configured to be supported on a support beam via an antenna support node. The antenna support node can comprise an enclosure including silica cement.

RF interface equipment can be arranged between the dual wire assembly and the communications equipment. The RF interface can be configured to transform the impedance differential between the dual wire assembly and the communications equipment. The RF interface equipment can be embedded in silica cement within the antenna support node, or can otherwise be arranged within an enclosure that can include silica cement such that the RF interface equipment can withstand fire or high temperatures. One of ordinary skill in the art would understand that the RF interface can be used in other locations.

A wire wrap can be included that encapsulates the dual wire assembly. The wire wrap can have a thickness that is configured to provide a predetermined spacing from external metal objects.

The system can provide a transmission medium via the dual wire assembly having a 300-ohm impedance.

The first and second wires can each be a 24-gauge wire. Air can be used as a dielectric between the first and second wires. The predetermined distance between the wires can be at least 3 mm. In one specific configuration, the predetermined distance between two 24-gauge wires for achieving a 300-ohm impedance can be approximately 2.625 mm. One of ordinary skill in the art would understand that the size of the wires, the dielectric and the separation between the wires can vary.

An RF connector can be included that is configured to be connected to an end of the dual wire assembly. The RF connector can comprise a base plate and an enclosure defined by at least a cap and a base, and the enclosure can be filled with silica cement. The RF connector can include anchoring members configured to physically engage with the wires to ensure that the wires remain taut, thereby ensuring a reliable impedance. The RF connector can also include a printed circuit board or other electrical components and/or circuitry configured to provide an electrical connection with the wires.

Additional features and aspects of the system are disclosed herein.

BRIEF DESCRIPTION OF THE DRAWINGS

FIG. 14 is a schematic view of an RF interface assembly and an antenna node arranged relative to a structure.

DETAILED DESCRIPTION OF THE INVENTION

Figure 1:
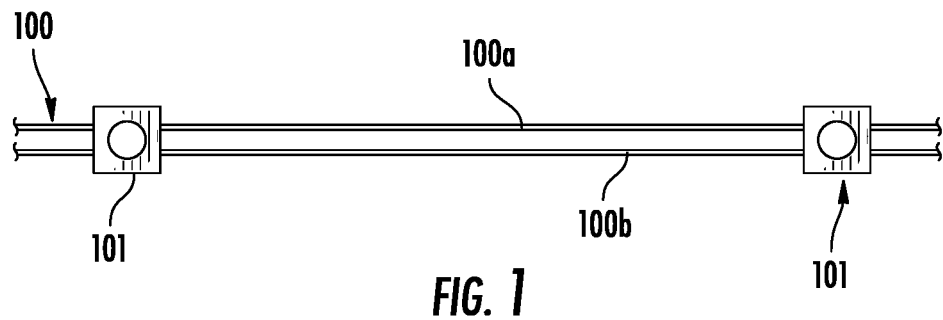
FIG. 1 is a top view of a dual wire assembly.
Figure 2:
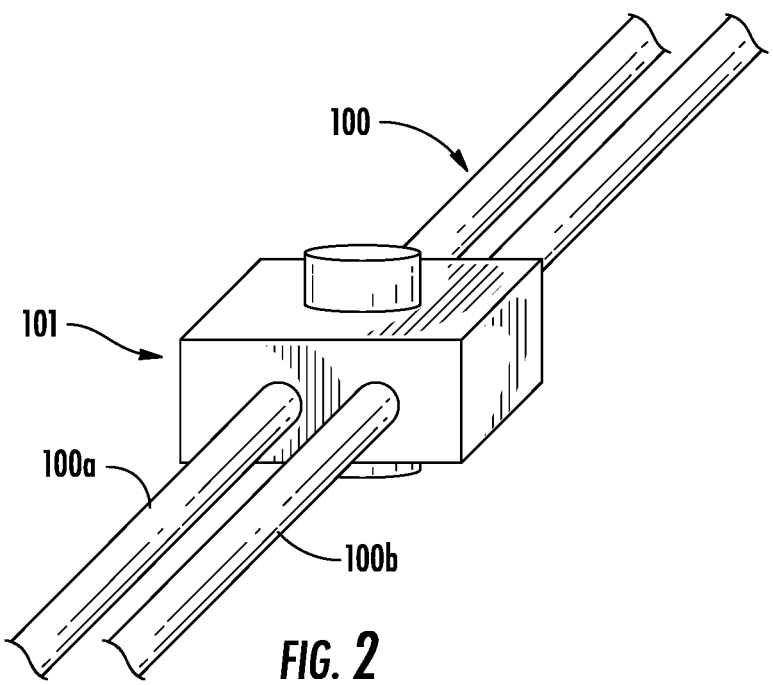
FIG. 2 is a perspective view of the dual wire assembly of FIG. 1.
Figure 3:
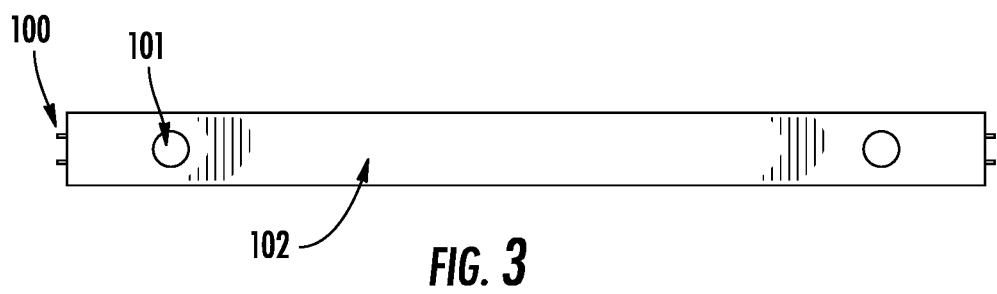
FIG. 3 is a top view of a dual wire assembly including a wrap.

Wireless radio communications are used inside buildings or other structures to coordinate response by first-responders, local security and facility personnel. Wireless infrastructure that distributes the wireless radio signal throughout the building can be susceptible to the high temperatures, which occur during structural fires.

One of the components of an in-building wireless infrastructure is the RF cables and antennas used to distribute the RF signals used by the responders. When these components fail due to the high temperature of a fire, as described in test standards (e.g. UL 2196 or related standards) which require the communication components to withstand at least two hours of temperatures at 1850° F. followed immediately with a water spray, then systems fail and responders cannot coordinate their life-saving activities putting the public at risk. The configurations disclosed herein address these problems, among other issues.

Dual wire assemblies, also known as twin-lead cable assemblies, generally provide a more practical, simpler, and cost-effective solution as compared to coaxial wire assemblies. The material used to form the wire and the dielectric coefficient between the wires, whether in a coaxial or dual wire system, dictates the impedance of the transmission cable. Coaxial cables generally use plastics of some type to maintain the separation of the inner core wire and the outer ground shield surrounding the inner core wire. However, it is difficult and or expensive to implement a plastic insulator that can withstand the high temperatures.

Regarding dual wire assemblies, other than the material used to form the wires themselves, the material separating the two wires and contributing to the impedance calculation can be air. Therefore, the performance of a dual wire assembly is not negatively impacted if the wires experience high temperatures. There is no plastic or dielectric to melt or burn off under high temperature conditions potentially allowing the wire conductors to move, change impedance or short out, each of which negatively impact the transmission of the radio signal. In one embodiment, the wires can be coated with a material, such as a ceramic coating, to prevent the wires from touching each other thereby preventing shorting.

Furthermore, providing a taut mounting system is required to ensure that the impedance is maintained because maintaining taut wires ensures that the wires remain separated. As used in this context, the term taut means that the wires do not experience any sagging and do not have any slack. One benefit to the dual wire assembly disclosed herein is performance under extreme heat and fire, while maintaining the dual wire assembly under tension to ensure that the two wires are precisely spaced from each other.

Other factors determining impedance and proper radio signal transmission, such as wire diameter, do not change under high temperature because of the selection of high temperature materials for the wire (e.g. steel, copper, etc.).

The present disclosure includes spacers and a tension system to ensure that the wires will not short under the high heat, fire conditions, and shock. These issues are all fatal for coaxial cable systems. However, one of ordinary skill in the art would understand that the configurations disclosed herein could be adopted for use with a coaxial cable system.

The present disclosure can generally include RF cables and antenna that are configured to withstand the high temperatures of building fires and continue to operate assuring that first responder personnel can continue to coordinate and conduct life-saving activities during emergency incidents.

The present disclosure uses high temperature materials in combination with mechanical design methods that assure that both the cable and antenna assembly can continue to operate even under the most extreme temperature and water shock conditions.

Fire-proof rated cables that currently exist are configured to only carry low frequency signals as needed for fire alarm systems. Some other known two-hour rated RF cables experience compatibility issues with associated antennas and connectors. Additionally, current designs require a precise separation of conductors to maintain the impedance and rely on the materials in between the conductors and/or ground plane to establish the RF impedance. However, the materials used for these components are not high temperature rated. Once these materials burn under the intense heat of a fire, which can reach 1850° F., the transmission characteristics are severally impaired or are completely disrupted due to the catastrophic failure of the communications cable assembly. Coaxial cable that is manufactured to withstand these environments is very expensive and still lacks any fire-rated RF connectors or antenna.

The present disclosure also includes a fire-rated antenna, and can include multiple fire-rated taps, couplers and multiple antennas to achieve a local communications network.

In one example, a dual wire system is disclosed herein that generally comprises a dual wire assembly 100, separator nodes 101, anchor nodes 103, pivot nodes 105, antenna support nodes 106, and RF interface equipment 109.

The dual wire assembly 100 is the transmission medium that carries the RF signal while providing the proper impedance to the radio system by maintaining the conductors (i.e. wires) at the required separation. The dual wire assembly 100 can be formed from copper, steel, copper coated steel or a similar alloy wire that provides adequate strength and high temperature tolerance. In a preferred embodiment, the dual wire assembly 100 includes wires formed from copper coated steel. At least two wires 100a, 100b can be included in the dual wire assembly 100.

The separator nodes 101 are attached to the dual wire assembly 100 and are configured to establish and maintain the proper separation between the dual parallel wires 100a, 100b. The separator nodes 101 can either grip the wires 100a, 100b or provide some degree of sliding along the wires 100a, 100b. Impedance of the transmission is established based on the diameter of the wires 100a, 100b as well as the separation between the wires 100a, 100b. Therefore, it is critical to maintain the correct separation in the final installation and during any high temperature event. This separation can be provided via a variety of ways, as discussed in further detail herein, such as simply keeping the wires 100a, 100b under sufficient tension, or including additional components, such as separator nodes 101 or pivot nodes 105 that perform a separation or tensioning function.

The separator nodes 101 can be arranged at a predetermined interval along the dual wire assembly 100 to ensure that proper separation is maintained. The separator nodes 101 can be made of high temperature resistant material, such as furnace concrete or cement, or low coefficient of expansion glass, or any other, non-conductive, high-temperature resistant material. As used in this context, the term high-temperature resistant means resistant for at least two hours to at least 1850° F., such that the separator nodes 101 will not melt, deform, or otherwise fail if exposed to a fire or other high temperatures. The separator nodes 101 therefore are configured to act as an insulator, separator, and spacer for the dual wire assembly 100.

The pivot nodes 105 can also be made of a high-temperature resistant material, such as furnace concrete or cement, or low coefficient of expansion glass, and provide the encapsulation and attachment of either the end points of the dual wire assembly 100 or a pivot point to change path direction of the dual wire assembly 100. In this way, the pivot nodes 105 can be considered mounting node. These pivot nodes 105 are also configured to pull the dual wire assembly 100 taut and attach the dual wire assembly 100 to the building infrastructure. Pulling the dual wire assembly 100 taut is critical because it assures that the wires 100a, 100b maintain the requisite separation which defines their impedance. The pivot nodes 105 provide interfaces or attachment points between the dual wire assembly 100 and a connector, such as the anchor node 103.

The pivot node 105 can be considered a "permanent" pivot element or a fixed position and angle pivot element based on the wires 100a, 100b entering an axial or longitudinal end face (i.e. the left-hand side of pivot node 105 in FIGS. 7 and 8), and exiting a side face of the pivot node 105. The angle of the wire entrance and wire exit can vary, but can generally provide a permanent angle or pivot for the wires 100a, 100b that extend within the pivot node 105. Passages or other openings can be provided in the pivot node 105 for the wires 100a, 100b. Once the wires 100a, 100b are inside of the pivot node 105, then the pivot node 105 can be pulled (i.e. via an anchor) such that the wires 100a, 100b are tensioned and taut. Another type of pivot node does not require the wires to extend within the node itself and instead is configured to allow for the wires to be wrapped around the node, preferably in predefined notches or receptacles formed on an outer body or surface of node, such as the pivot node 205 shown in FIGS. 13A-13D.

The anchor node 103 is configured to attach the pivot node 105 to the building infrastructure, such as a wall or a steel beam. The anchor node 103 can include any fastening or connection element that is configured to attach, link, or otherwise secure the pivot node 105 to a building structure (i.e. beam, frame, etc.). The pivot node 105 is configured to be very compact, while also providing the required support for the dual wire assembly 100. The anchor node 103 can comprise a steel tension spring, steel turnbuckle, and/or steel wire hooks configured for suspending the dual wire assembly 100 and assuring the dual wire assembly 100 remains taut and separated away from other metal.

Figure 7:
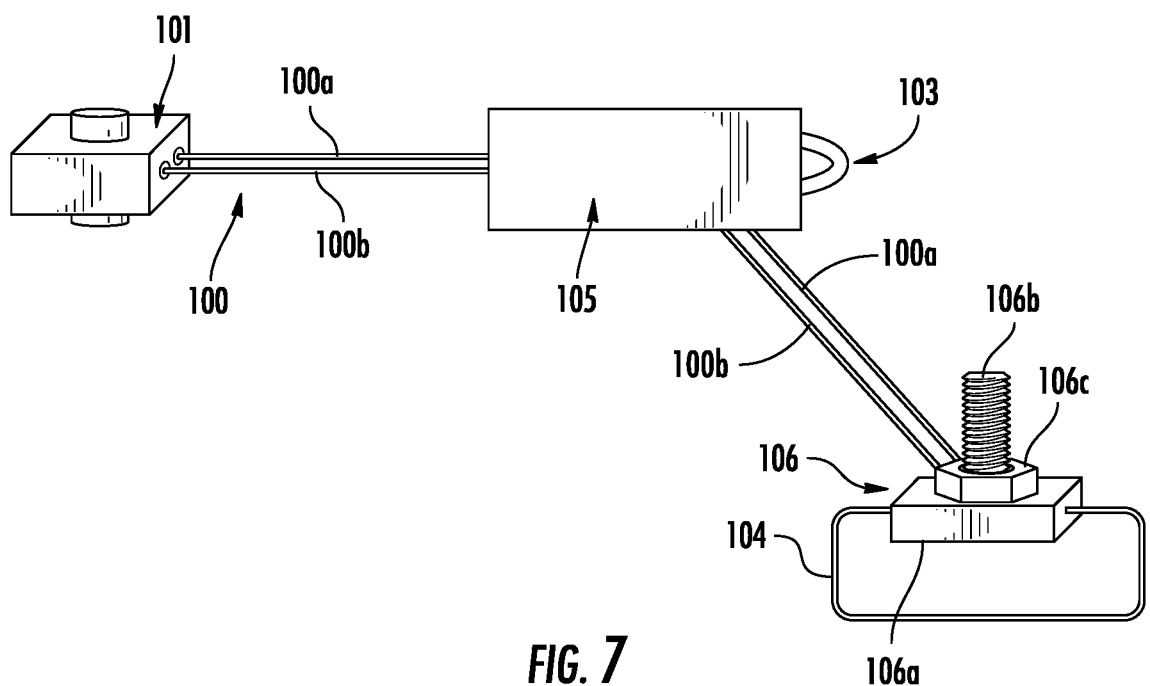
FIG. 7 is a schematic view of a dual wire assembly attached to a pivot node and an antenna assembly.

The antenna support node 106 is configured to house or support an interface between the dual wire assembly 100 and an antenna 104. The antenna support node 106 can provide a mounting support for the antenna 104 to a supporting structure, such as a ceiling or wall. The antenna support node 106 is configured to house, enclose, or otherwise support the attachment or interface between the dual wire assembly 100 and the antenna 104. As shown in FIG. 7, the antenna support node 106 can include a block or enclosure 106a configured to house an interface between the antenna 104 and the dual wire assembly 100. The enclosure 106a can be comprised of fire-proof material, such as silica cement, furnace cement, etc., such that a portion of the antenna 104 and a portion of the dual wire assembly 100 are encased in the enclosure 106a. Additional mounting components, such as a steel beam 106b and mounting nut 106c can be provided for further securing the antenna support node 106 relative to a support structure or portion of a building.

Figure 8:
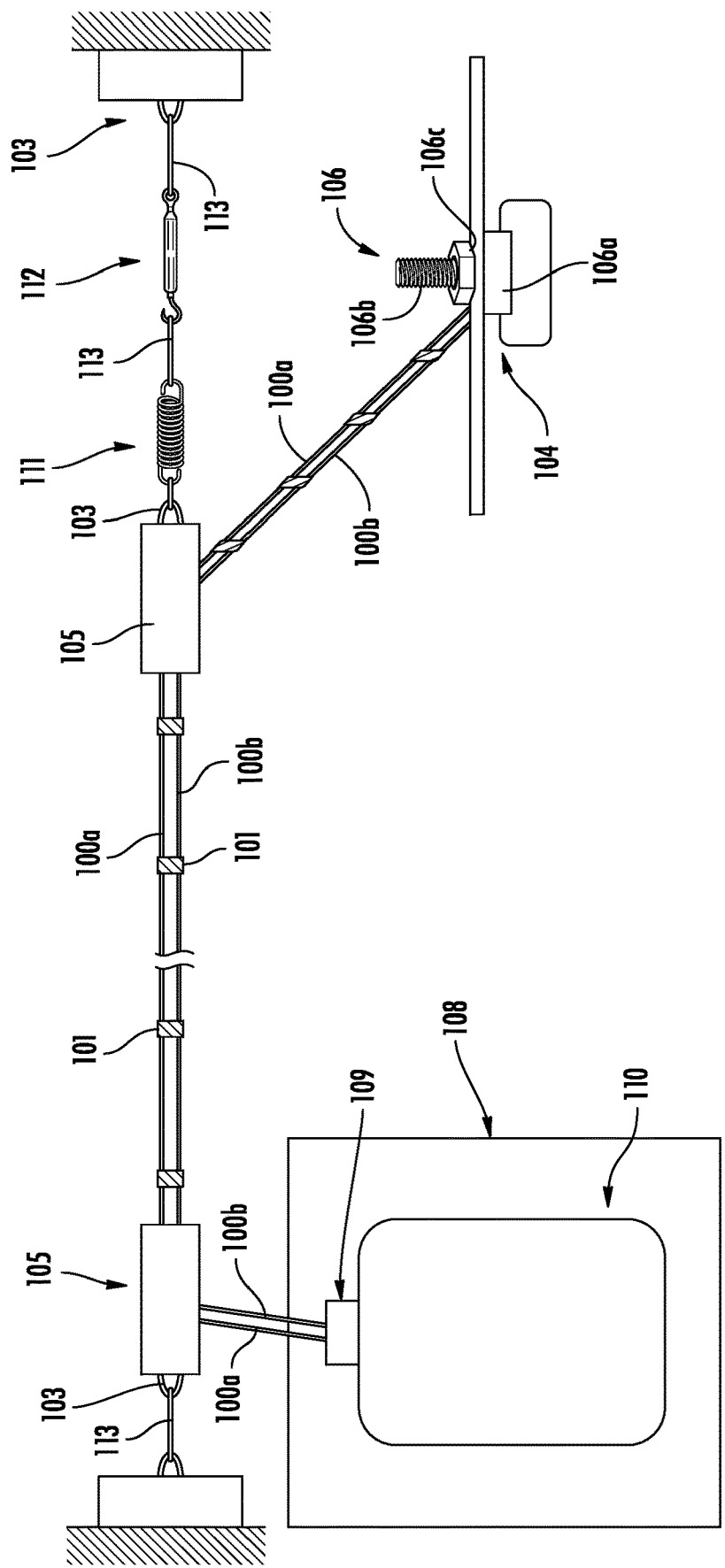
FIG. 8 is a schematic view of a dual wire assembly in an installed state.
Figure 12:
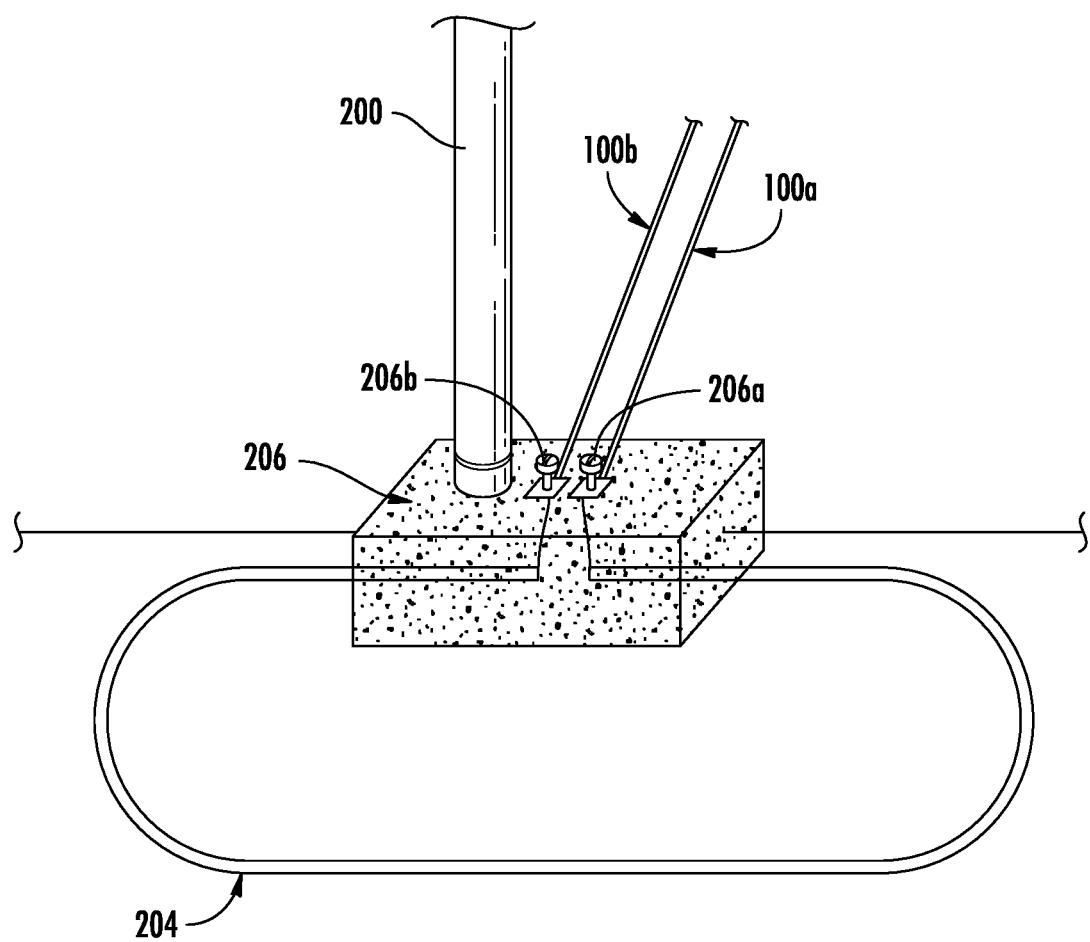
FIG. 12 is a side view of an antenna node according to one example.

In one aspect, the antenna 104 is formed from stainless steel, copper coated steel, or a similar high temperature conductive material. The antenna 104 can be formed as a folded dipole in the one embodiment. In one installation method, the dual wire assembly 100 can be suspended above a drop ceiling and the antenna support node 106 can be configured to be mounted on the other side (i.e. bottom side) of the drop ceiling. An example of this configuration is shown in FIGS. 8, 12, and 14.

Stainless steel or similar electrically conductive material can be used to form the antenna 104 due to its ability to withstand high temperatures and also radiate and receive wireless signals. The antenna 104 can be configured to provide an impedance that matches the impedance of the dual wire assembly 100, in one aspect.

Depending on the embodiment, radio frequency matching circuitry, such as a 300-ohm to 50-ohm balun (i.e. balance to unbalanced convertor or balancing unit) may be provided between the dual wire assembly 100 and the antenna 104 if the impedances are different. Any circuitry or equipment configured to match impedances can be embedded in fire proof materials, such as furnace cement or concrete, and can be made of specific materials configured to withstand the high temperatures for a predetermined time, such as two hours at 1850° F. The circuitry or equipment can be mounted inside rooms that are rated for two hours of fire proof protection, which can include stairwells or communication rooms that can be enclosed or walled off via cinder blocks.

A wire wrap 102 can be provided to define a spacing buffer, i.e. in a lateral or peripheral direction, for the wires 100a, 100b of the dual wire assembly 100 to reliably provide separation between the dual wires 100a, 100b and other metal objects that may be encountered in the installation (i.e. beams, other cables etc.). Any contact between adjacent metal components and the dual wire assembly 100 can negatively affect the impedance of the transmission line. Therefore, the wire wrap 102 may be used to provide guidance during installation to denote the minimum separation required.

Figure 4A:
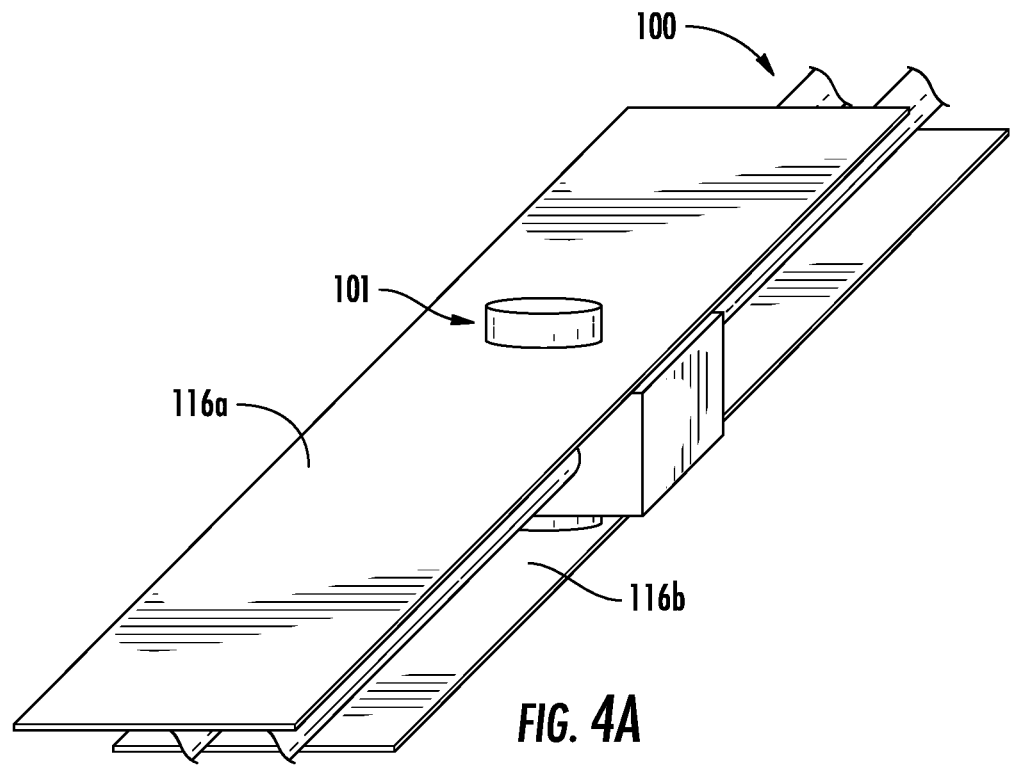
FIG. 4A is a perspective view of a dual wire assembly including stiffening layers or elements.
Figure 4B:
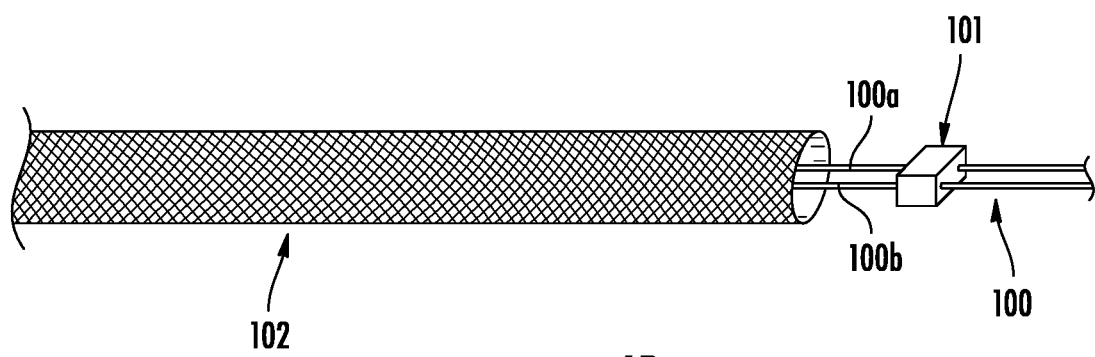
FIG. 4B is a side view of a dual wire assembly including a wrap.

Referring to FIG. 4A, a stiffening layer 116a, 116b can be provided for the dual wire assembly 100. The stiffening layer 116a, 116b can be formed from a hardened plastic or other rigid material. The stiffening layer 116a, 116b can be formed from a fire-resistant material. The stiffening layer 116a, 116b can include a top and bottom layer that are applied to the dual wire assembly 100. The stiffening layer 116a, 116b can include four layers that are applied to the top, bottom, first side, and second side of the dual wire assembly 100. The stiffening layer 116a, 116b can provide increased rigidity and protection for the dual wire assembly 100. The wire wrap 102 can then be arranged around both the stiffening layer 116a, 116b and the dual wire assembly 100. Alternatively, the wire wrap 102 can be arranged directly around the dual wire assembly 100 without the use of the stiffening layer 116a, 116b.

The dual wire assembly 100 is generally configured to establish a transmission medium. In one aspect, the transmission medium has an approximately 300-ohm impedance. For maximum power transfer, the antenna 104 can also be designed with a matching impedance as the dual wire assembly 100, which can be a 300-ohm impedance. Forming the antenna 104 as a folded dipole provides a configuration that allows for this specific impedance. One of ordinary skill in the art would understand that alternative impedances, such as 50-ohm, 75-ohm, etc., can be utilized on the dual wire assembly 100. Alternative antenna designs could be used based on the required impedance, which can be dictated by the dual wire assembly 100.

In some structures, communication equipment 110 can be installed or arranged that are configured as a radio transmitter or bidirectional amplifier.

If the communication equipment 110, such as an in-building booster amplifier or bidirectional amplifier, has an RF port with an impedance that is different from the dual wire assembly 100 impedance, then RF interface equipment 109 can be used as an impedance matching interface or component. For example, if the communication equipment 110 has a 50-ohm unbalanced antenna port and the dual wire assembly 100 has a 300-ohm impedance, then the RF interface equipment 109 can provide an impedance matching interface that converts the 50-ohm impedance to the 300-ohm impedance. In one specific example, a 6-to-1 impedance balancing configuration can be provided via the RF interface equipment 109. When the antenna 104 has a different impedance than the dual wire assembly 100, then RF interface equipment 109 including inductors or capacitors or baluns (i.e. balanced to unbalanced convertors or balancing unit), or other circuit components, can be implemented to electrically match or align the transmission between the antenna 104 to the dual wire assembly 100.

Based on the present disclosure, one of ordinary skill in the art would understand that other impedance values can be used instead of 300-ohm, such as 200-ohm or 100-ohm. The RF interface equipment 109 can be adapted to accommodate any different impedance values. The calculation to achieve the alternate impedance (i.e. 100-ohm or 200-ohm) can be used to determine any requisite separation distances between the wires 100a, 100b.

As shown in FIG. 8, the communications equipment 110, which may not necessarily have a fire rating, can be arranged within an enclosure 108 that includes fire proofing protection. For example, the communications equipment 110 can be arranged in a two-hour fire rated enclosure, room, box, or other compartment within a structure.

The antenna 104 can be made of stainless steel or other materials which are conductive and can withstand the high temperature requirements. In one embodiment, the antenna 104 is configured to present a balanced signal interface and an impedance of approximately 300-ohms, which can also be the impedance of the dual wire assembly 100, in one example.

Using the calculation below, the impedance (Z) can be determined based on the dielectric materials used and the dimensions for the dual wire assembly 100, as well as the antenna 104. In the equation below, (Z) is the impedance of the dual wire assembly, ($\epsilon_r$) is the effective dielectric constant of material separating the wires 100a, 100b, (D) is the separation of the wires 100a, 100b in millimeters, and (d) is the diameter of the wires 100a, 100b in millimeters.

$$Z = (119.92 \Omega/\sqrt{\epsilon_r})\ln(2(D/d)) = (276\ \Omega/\sqrt{\epsilon_r})\log_{10}(2(D/d))$$

Figure 5A:
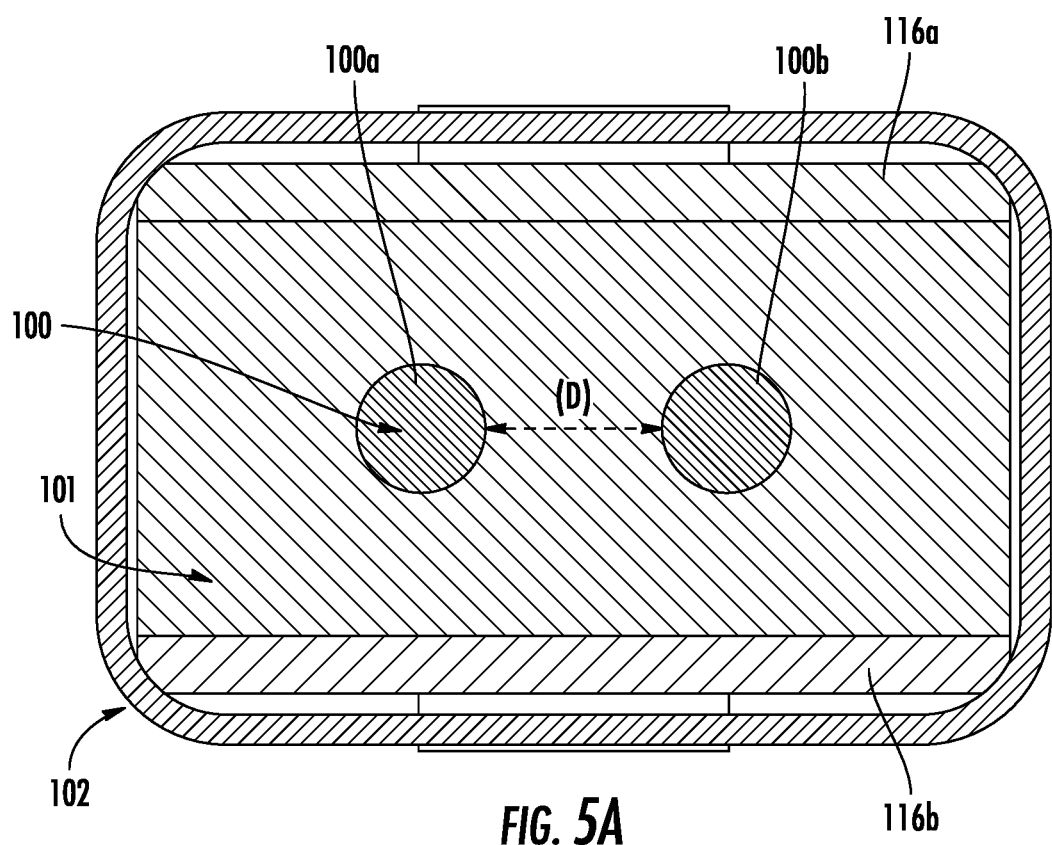
FIG. 5A is a cross-sectional view of a dual wire assembly including a wrap and stiffening layers or elements.
Figure 5B:
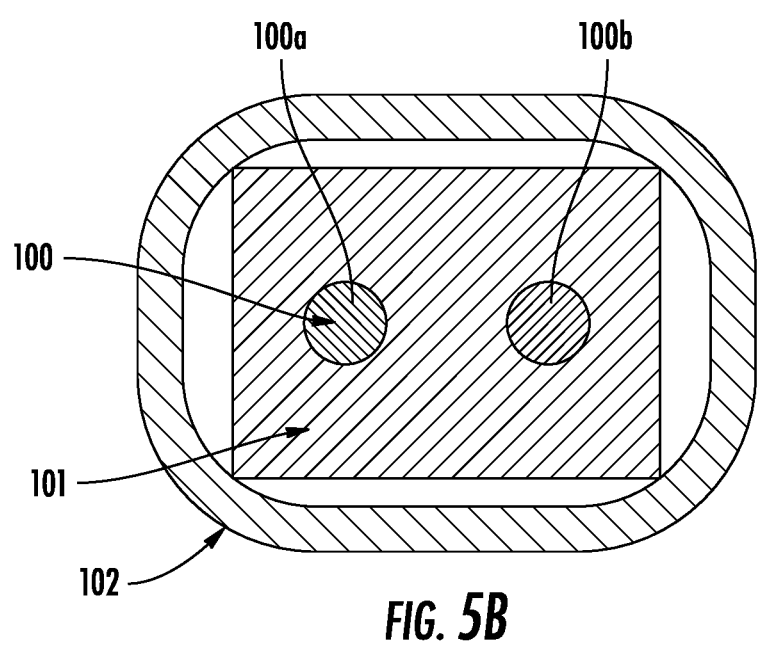
FIG. 5B is a cross-sectional view of a dual wire assembly including a wrap.
Figure 6:
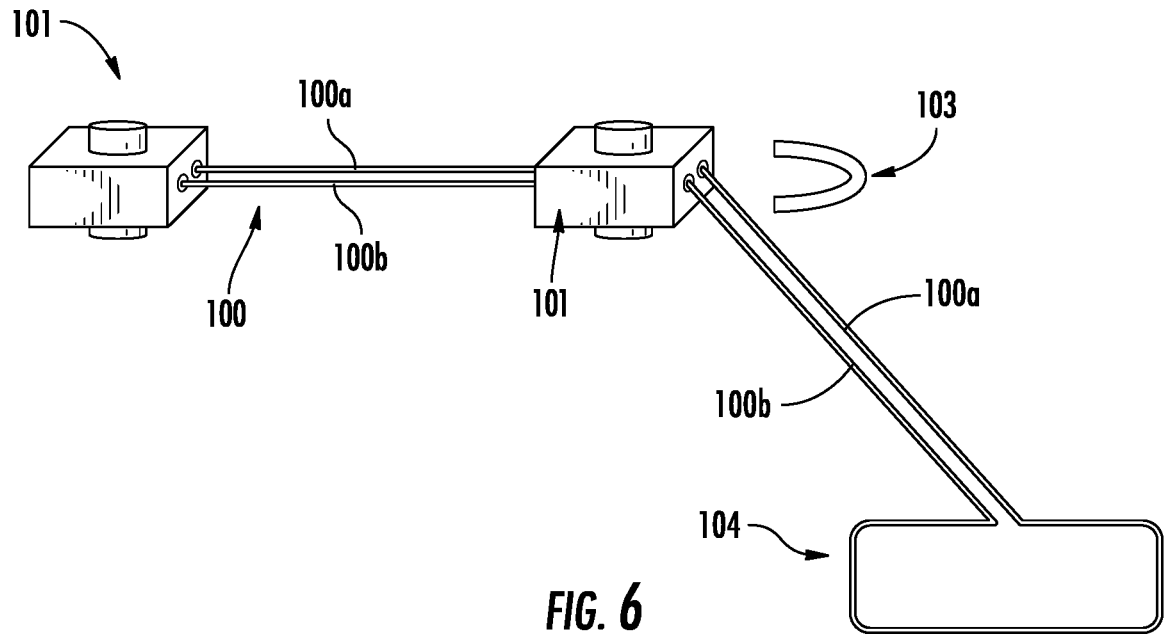
FIG. 6 is a simplified schematic view of a dual wire assembly attached to an antenna assembly.

In one aspect, a 24-gauge wire is used for the wires 100a, 100b, with an air dielectric environment to achieve a nominal 300-ohm impedance. This results in a separation between the dual wires 100a, 100b of approximately 2.625 mm. The predetermined spacing (D) between the wires 100a, 100b is shown as (D) in FIG. 5A. Based on the relatively small separation between the wires 100a, 100b, any potential disruption in signal transmission due to contact with external or surrounding objects is minimized.

Once the separation between the wires 100a, 100b is established, it can be set and maintained by the separator nodes 101, which can be formed from an insulating material. The separator nodes 101 can be made of any material configured to withstand the high temperatures experienced during fires. In one aspect, a low coefficient of expansion (COE) glass (e.g. 33 COE glass) or a high temperature furnace cement (e.g. silicate cement) can be used to form the separator nodes 101. The pivot nodes 105 for the dual wire assembly 100 and the antenna support node 106 can also be made of high temperature materials, such as silicate cement. Mold forms can be used to form and shape the pivot node 105.

A screw mount or other type of mounting arrangement can be configured to attach the antenna support node 106 to the ceiling or other surface of the building or structure. These wire and antenna components, as well as any radio frequency circuit matching components needed to adapt the impedance of the dual wire assembly 100 to the antenna 104 can be permanently embedded in the material of the antenna support node 106, thereby protecting the equipment from high temperatures and exposure to fire.

FIG. 8 illustrates one aspect of the present disclosure. As shown in FIG. 8, the mounting and tension system, which can include the anchor node 103, a tension mount 111 (such as a spring), a tension adjuster 112 (such as a turnbuckle) or other adjustment mechanism, and supports 113 can be formed from stainless steel or equivalent materials configured to withstand the high temperatures of a fire, i.e. at least 1850° F. for two hours, and exposure to water. One of ordinary skill in the art would understand that various steel wires or other elements can be arranged between the pivot nodes 105 and the building's structure. The supports 113 can be configured to attach to the anchor node 103 on a first end and the pivot nodes 105 on a second end. As shown on the left hand of FIG. 8, the pivot node 105 can be connected directly to the building structure via the anchor node 103 and a support 113. In contrast, a tensioning arrangement is shown on the right hand side of FIG. 8 in which the pivot node 105 is connected to the tension mount 111 via the anchor node 103, and the tension adjuster 112 is connected to the tension mount 111 to allow for variable tension adjustment. Once partially installed, personnel can tighten the tension adjuster 112 to ensure that the dual wire assembly 100 is properly taut or tensioned.

The antenna support node 106 can be formed from stainless steel or equivalent material, and is configured to be attached to a structural beam, such as a steel beam, of the building such that the antenna support node 106 will remain in place and not collapse if the building is exposed to high temperatures or a fire. This antenna support node 106, which can be formed of metal, is arranged to be at least 3 mm away from the dual wire assembly 100 so as to avoid any negative impact to the signal integrity (i.e. impedance, voltage standing wave ratio (VSWR), RF attenuation, etc.).

In another aspect, the antenna support node 106 can be suspended with steel cable from the building infrastructure such as I-beams that will withstand the high temperatures. The antenna support node 106 also requires adequate clearance from metal objects. The distance can vary depending on the frequency of operation. For example, at 800 MHz, the distance between the antenna support node 106 and any surrounding metal can be 1 inch-5 inches, while at very high frequencies (~150 MHz) the distance may need to be up to 12 inches. One of ordinary skill in the art would understand that these distances will vary depending on the particular application. Testing at the operating frequency can determine the requisite distance. Some of the critical common parameters of testing this distance can include effective radiated power (ERP) or radiated power, voltage standing wave ratio (VSWR), frequency flatness, transmission pattern, etc.

In one aspect, the mounting components (i.e. the anchor node 103, the tension mount 111, the tension adjuster 112, support 113, etc.) are attached to parts of the in-building infrastructure that are configured to withstand high temperature, such as a steel building frame.

As one of ordinary skill in the art would appreciate from this disclosure, many of the components can be modified, omitted, or rearranged depending on the particular installation requirements. For example, the tension mount 111 and the tension adjuster 112 can be omitted or substituted by other mounting methods that are configured to provide tension to keep the dual wire assembly 100 taut and prevent any sagging. As one of ordinary skill in the art would appreciate from this disclosure, the antenna support node 106 can be omitted. Additionally, the wrap 102 on the wires 100a, 100b can be eliminated if the installation is performed such that any contact with metal objects is avoided for the wires 100a, 100b. The separator nodes 101 can be mounted at varied spacing (e.g. every 12 inches), or could also be omitted if the dual wire assembly 100 is short or under sufficient tension such that a change in the precise separation between the wires 100a, 100b is not a concern.

As one of ordinary skill in the art would appreciate from this disclosure, the mounting system can be eliminated or modified if the dual wire assembly 100 is placed or used in such a manner that it will not change the separation between the dual wires 100a, 100b. In one aspect, the dual wire assembly 100 does not have to be mounted at two points in a straight line. The dual wire assembly 100 can also be made to turn or be angled by using a non-metallic pivot point and then proceed at an angular direction. This method can be used if the coverage area is not in a straight line from the communications equipment 110 and must turn, for example, down a hallway or around any other non-linear pathways. The dual wire 100 can be suspended from a building mounting point and then the antenna support node 106 can hang downward towards the coverage area.

Figure 16:
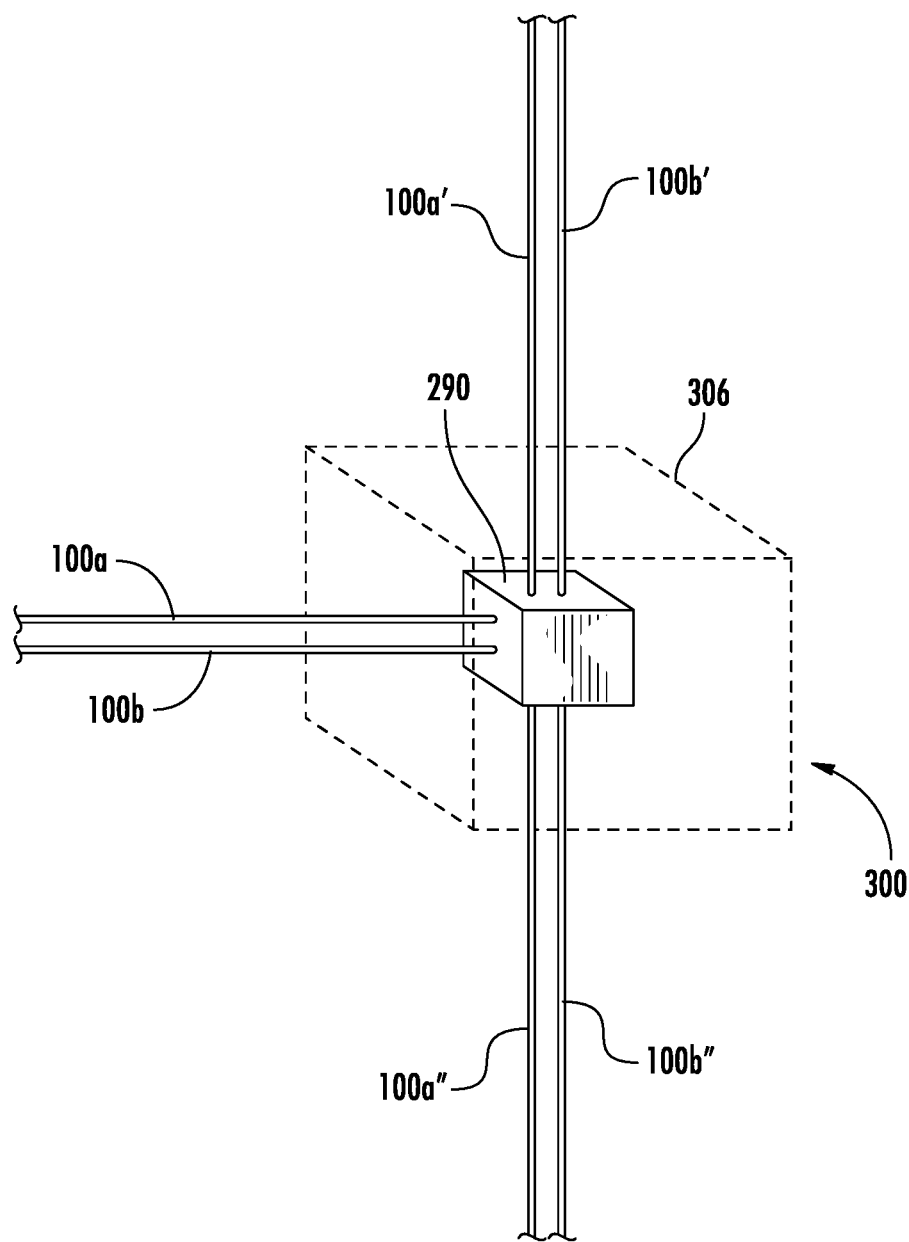
FIG. 16 is a schematic view of a splitter element configured for use with the dual wire assembly.
Figure 17:
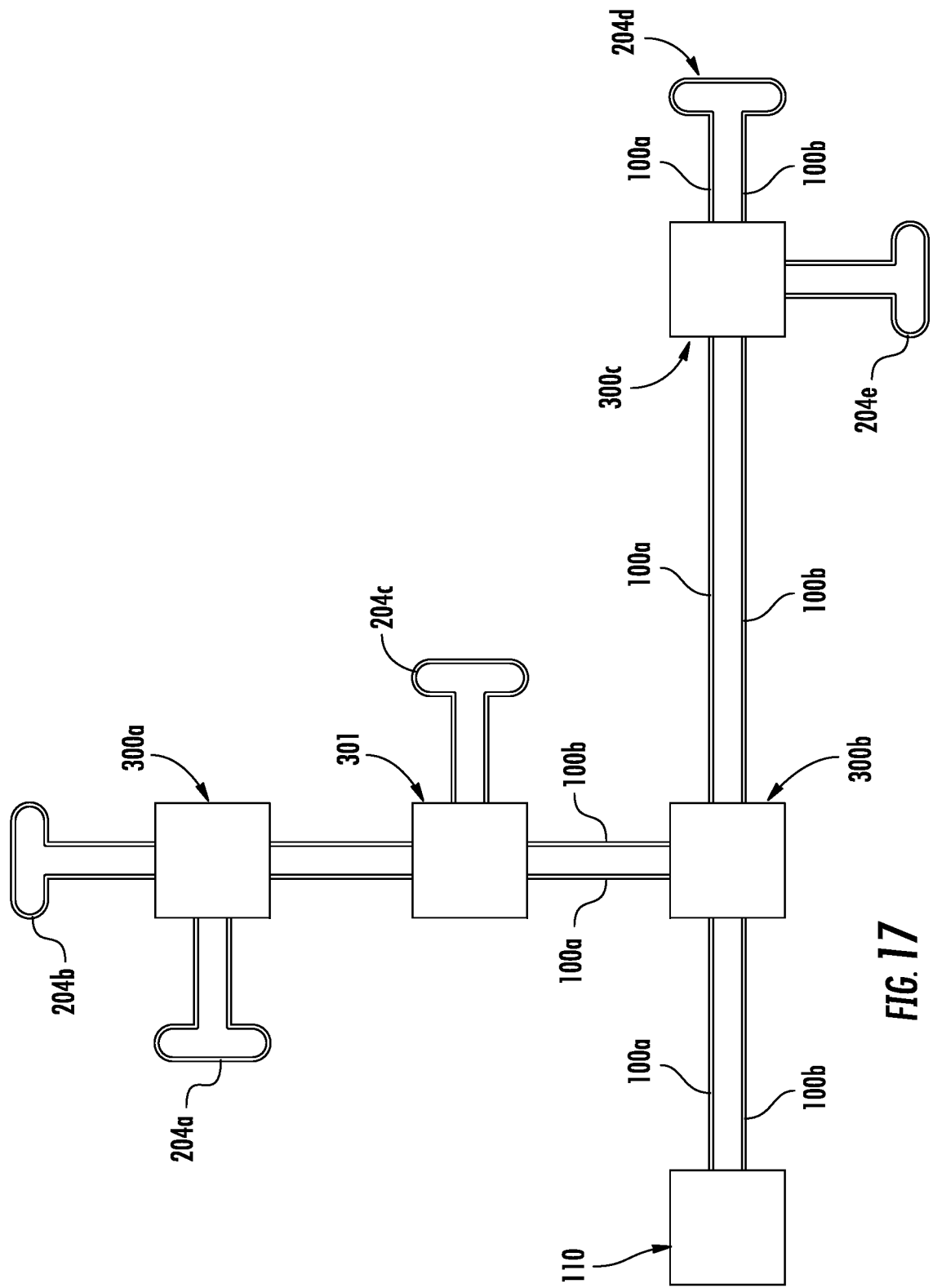
FIG. 17 is a schematic view of a series of antenna and splitters configured for use with the dual wire assembly.

The dual wire assembly 100 can be configured to be hung from any number of structures or vehicles, such as a tower, ceiling, hovering helicopter, blimp, drone, etc. Additional antennas can be connected to the dual wire assembly 100 by using splitters and/or tap components embedded with the pivot node 105 or antenna support node 106 using high temperature node materials (e.g. silicate cement or equivalent high temperature material). The tap components, e.g. inductors and or capacitors, are configured to be compatible with the impedance of the dual wire assembly 100 and are configured to withstand embedding into the fire-proof materials, such as silicate cement. An example of a splitter and use of splitters with the dual wire assembly 100 is shown in FIGS. 16 and 17, as disclosed in more detailed herein.

Once the dual wire system is built, the dual wire assembly 100 can be mounted above the drop ceiling or similar pathway and the antenna support node 106 can be suspended at a level that is near the area requiring radio coverage, i.e. below the drop ceiling tiles.

The dual wire assembly 100 can be configured to be suspended in such a manner as described herein such that the wires 100a, 100b do not come into proximity of metal objects. In one aspect, this distance from the wires 100a, 100b and metal elements can be at least 3 mm.

Referring to FIG. 8, one end of the dual wire assembly 100 can be connected to communications equipment 110 (e.g. bidirectional amplifier (BDA), radio transmission equipment, or any equipment configured to transmit radio signals or other communication signals). The other end of the dual wire assembly 100 can be connected to the antenna support node 106 and the antenna 104. The dual wire assembly 100 can be affixed at either end to a building infrastructure, such as support beams. The pivot node 105 can be formed as a fire-proof block, such as silicate cement, that is configured to pull the dual wire assembly 100 taut. The communications equipment 110 is configured to transmit and receive signals via the dual wire assembly 100.

A user with a portable radio in the area near the end point antenna can receive wireless signal emanating from the antenna 104. When the user accesses their radio, the signal is received by the antenna 104, converted to an electrical signal onto the dual wire assembly 100, and transmitted through the dual wire assembly 100 to the communications equipment 110. This process establishes a communication channel between the user's radio and the communications equipment 110. The antenna 104 can be designed for any frequency band or for multiple bands (e.g. VHF, UHF, 700 MHz, 800 MHz etc.).

If a fire is present, the dual wire assembly 100 and the antenna 104 will continue to operate even under the high temperatures of a fire and under the shock of a water spray down to extinguish the fire. In one configuration, the communications equipment 110 is not fire rated, and can instead be encased or protected in a fire rated housing or enclosure 108, such as a dual layer sheetrock enclosure.

In one aspect, the dual wire system can be used as a durable and rugged transmission method e.g. in a desert terrain, where very high temperatures would cause coaxial RF cable to fail. The dual wire assembly 100 can extend for prolonged distances because it is configured to have lower RF losses as compared to coaxial RF cable. In one aspect, the antenna 104 is not necessary if the dual wire assembly 100 is used to connect two pieces of active equipment, as opposed to a passive radiating antenna.

In one aspect, the dual wire assembly 100 can be assembled with multiple taps and couplers, antennas and in-line booster amplifiers to achieve a larger local communications network. One of ordinary skill in the art would understand that the taps and couplers would need to be designed to withstand high temperatures, which could be achieved via embedding these components in silica cement.

Figure 9:
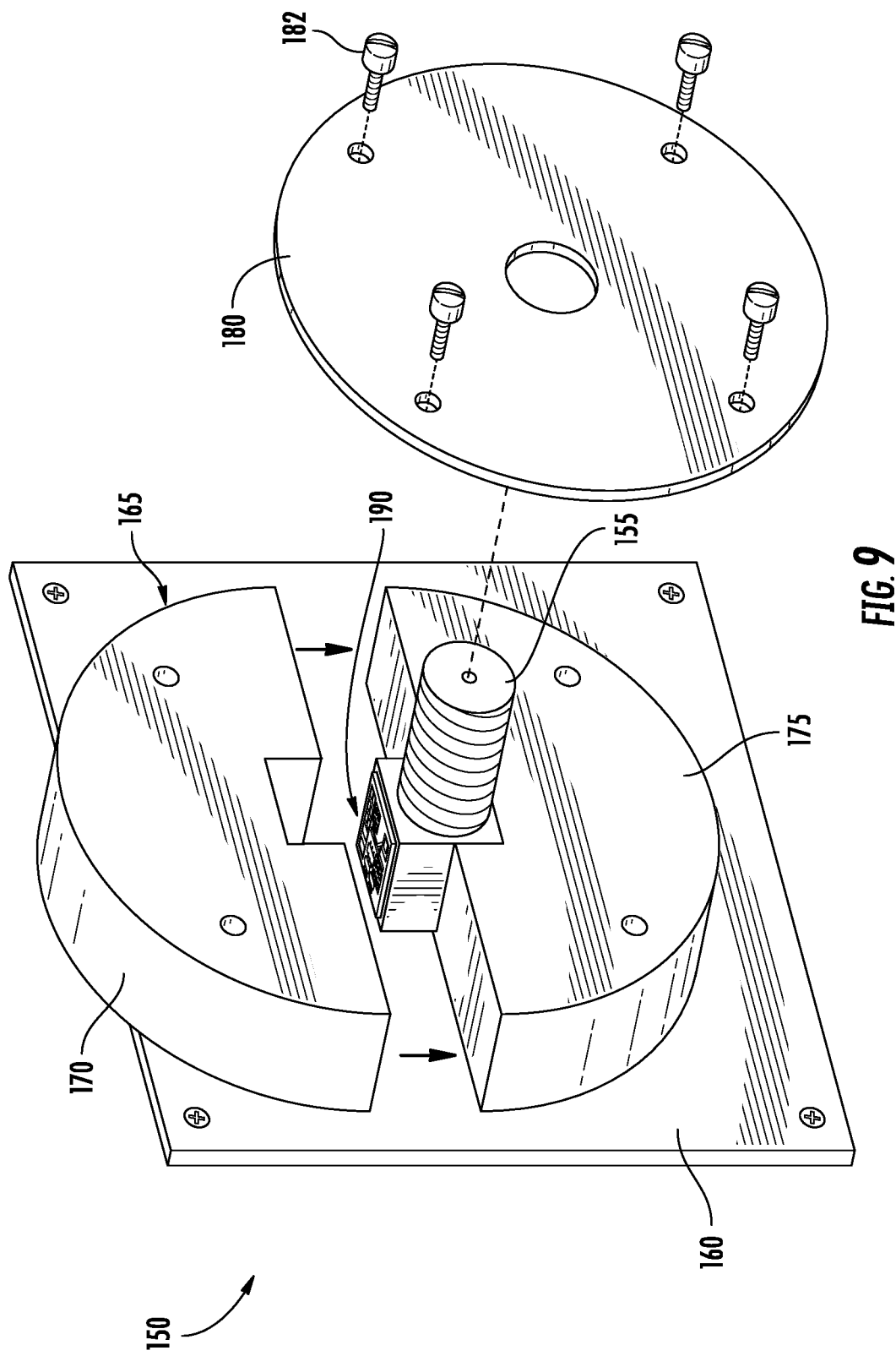
FIG. 9 is an exploded view of an RF interface assembly according to one example.

FIG. 9 illustrates an RF interface assembly 150 including an RF connector 155 mounted to a base plate 160. The RF connector 155 can be configured to be connected to the dual wire assembly 100. The RF connector 155 is configured to be encased or surrounded within an enclosure 165 that can include a cap 170, a base 175, and a plate 180. The enclosure 165 can be formed from silica cement, in one example. The cap 170 and the base 175 can be configured as two halves that are joined with each other to define an interior space dimensioned to accommodate a portion of the RF connector 155, as well as other electronic components. The plate 180 can be formed from steel, and at least one fastener 182, also preferably formed from steel, can be provided to secure the plate 180 to the cap 170 and the base 175 to define an interior space for the enclosure 165. Circuitry 190 can also be provided within the enclosure 165. The circuitry 190 can generally be configured to balance any impedance differences between the dual wire assembly 100 and antenna 104, or communications equipment 110, and also be configured to allow for transmitting and receiving signals between the dual wire assembly 100 and the RF connector 155. The dual wire assembly 100 is configured to be attached the circuitry 190 and can be connected in a variety of different ways to provide both an electrical and physical connection. The dual wire assembly 100 can be secured to the enclosure 165 via pivot attachment elements, which can ensure tautness of the dual wire assembly 100 thereby ensuring a consistent separation between the wires 100a, 100b. The RF interface assembly 150 can be used in a similar manner as element 109 in FIG. 8.

Figure 10:
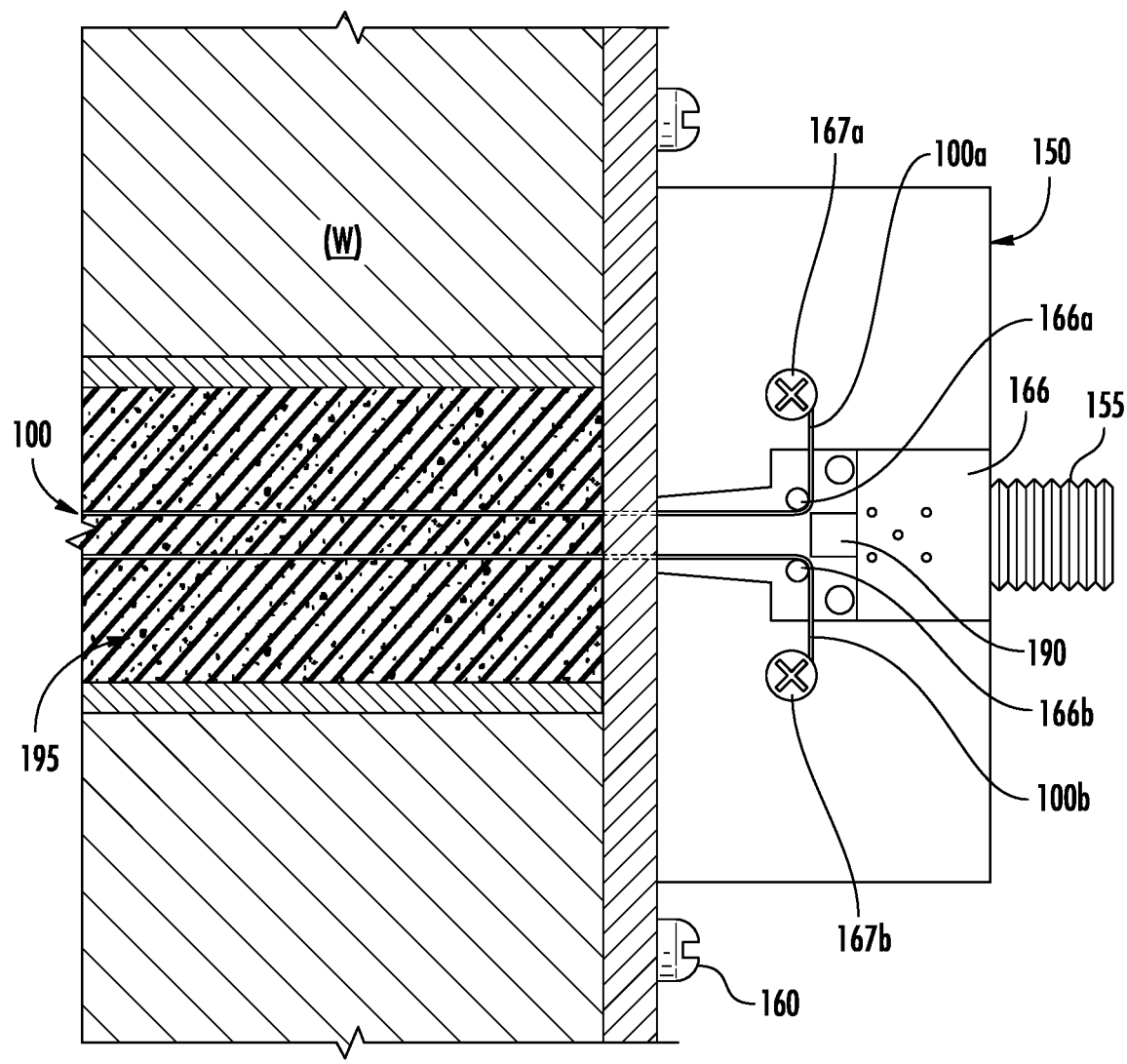
FIG. 10 is a side view of the RF interface assembly of FIG. 9 in an installed state.

FIG. 10 illustrates the RF interface assembly 150 in an installed state relative to a structure. Specifically, FIG. 10 illustrates the RF interface assembly 150 mounted to a wall (W), and connected to the dual wire assembly 100. As shown in FIG. 10, the RF interface assembly 150 is mounted to a wall (W) having a fire proof region 195. The fire proof region 195 can be configured to receive the dual wire assembly 100 and allow the dual wire assembly 100 to pass through the wall (W). The fire proof region 195 can be comprised of fire-proof foam or other fire-proof materials, as are well known by those familiar in the art. In one aspect, the entire wall (W) can be formed from fire proof material, such as dual layer sheetrock. A printed circuit board 166 can be provided within the RF interface assembly 150. As shown in FIG. 10, the wires 100a, 100b can each be configured to be attached to pivots 166a, 166b in the RF interface assembly 150 as a means to electrically connect the wires 100a, 100b to the printed circuit board 166 and circuitry 190, and to secure the wires 100a, 100b. The pivots 166a, 166b can provide electrical and physical connections for the wires 100a, 100b relative to the RF interface assembly 150. An electrical connection is thereby provided between the wires 100a, 100b and the circuitry 190, which allows the signals from the wires 100a, 100b to be converted or transmitted to the RF connector 155. Anchors 167a, 167b can also be provided in the RF interface assembly 150 to provide a further physical connection for the wires 100a, 100b. The anchors 167a, 167b can be configured to tension the wires 100a, 100b by wrapping the wires 100a, 100b around the anchors 167a, 167b or otherwise securing the wires 100a, 100b relative to the RF interface assembly 150. In another embodiment, the pivot point can also be designed to serve multiple purposes, such as a pivot element, electrical connection, and/or anchor.

Figure 11:
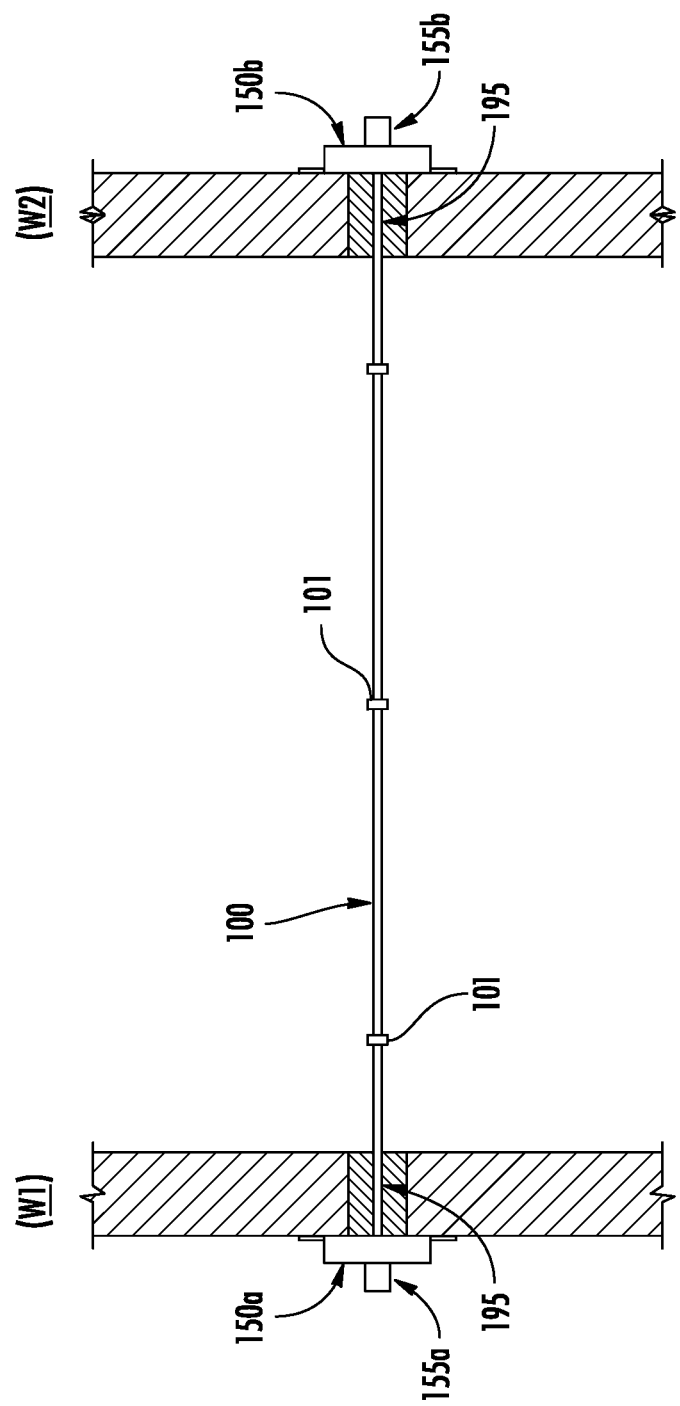
FIG. 11 is a schematic view of two RF interface assemblies arranged relative to a structure.

FIG. 11 illustrates a further arrangement in which two RF interface assemblies 150a, 150b can be situated relative to a structure. Specifically, FIG. 11 shows each RF interface assembly 150a, 150b being mounted to a different wall (W1, W2). Each of the walls (W1, W2) can include fire proof regions 195. A dual wire assembly 100 can extend between the RF interface assemblies 150a, 150b and through the fire proof regions 195 of each wall (W1, W2). RF connectors 155a, 155b can be provided on the RF interface assemblies 150a, 150b. A plurality of separator nodes 101 can be arranged along the dual wire assembly 100 in order to ensure that the wires 100a, 100b remain in a predetermined spacing configuration. Additionally, pivot nodes 105 can be used to hang or position the dual wire assembly 100 such that the wires 100a, 100b remain taut. The dual wire assembly 100 in FIG. 11 can be arranged in a non-rated space, i.e. a space that is not fire proofed or configured to withstand fire. Each of the RF interface assemblies 150a, 150b can include a respective pair of anchors and/or pivots configured to tension the dual wire assembly 100.

FIG. 12 illustrates another aspect of the disclosure. As shown in FIG. 12, the dual wire assembly 100 can be connected to an antenna support node 206. The antenna support node 206 is similar to the antenna support node 106 of FIG. 8. The antenna support node 206 can be mounted to a structure via at least one support 200. In one example, the at least one support 200 can include a steel mounting pipe or threaded rod connected to steel beams in a structure. The antenna support node 206 in FIG. 12 is similar to the antenna support node 106 of FIG. 8 and both features are configured to mount or support the antenna 104 relative to the structure. The antenna support node 206 can be formed from silica cement and can be mounted to a wall or ceiling in the structure. Terminals 206a, 206b can be provided on the antenna support node 206 that are configured to provide anchoring points for the wires 100a, 100b. In one aspect, the terminals 206a, 206b can be formed as screws, preferably formed from steel. Tensioning of the wires 100a, 100b can be controlled and maintained via a user wrapping or otherwise engaging the wires 100a, 100b such that the wires 100a, 100b are taut and engaged with the terminals 206a, 206b. The terminals 206a, 206b can also be configured to provide electrical connection between the wires 100a, 100b and the antenna 104 and to permanently secure the secure the wires 100a, 100b.

Figure 13A:
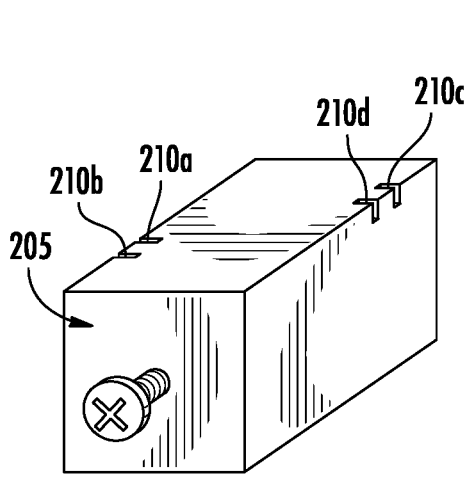
FIG. 13A is a perspective view of a pivot node configured to engage with a dual wire assembly.
Figure 13B:
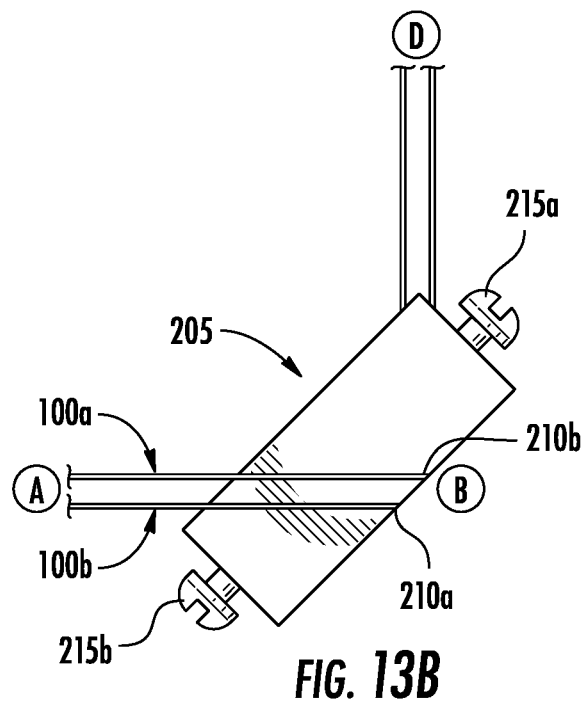
FIG. 13B is a top view of the support node of FIG. 13A in a first position.
Figure 13C:
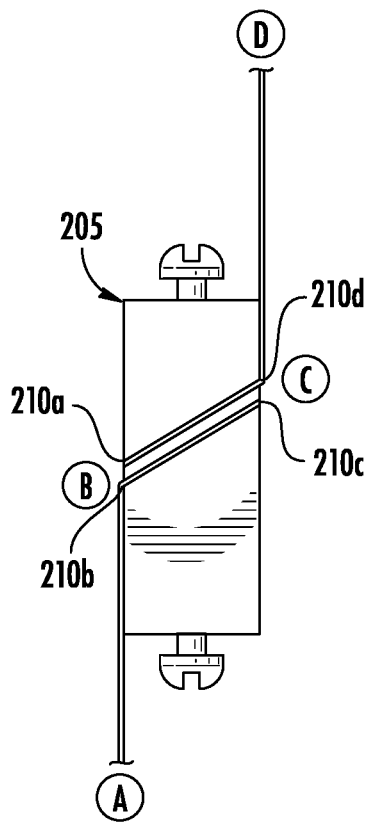
FIG. 13C is a top view of the support node of FIG. 13A in a second position.
Figure 13D:
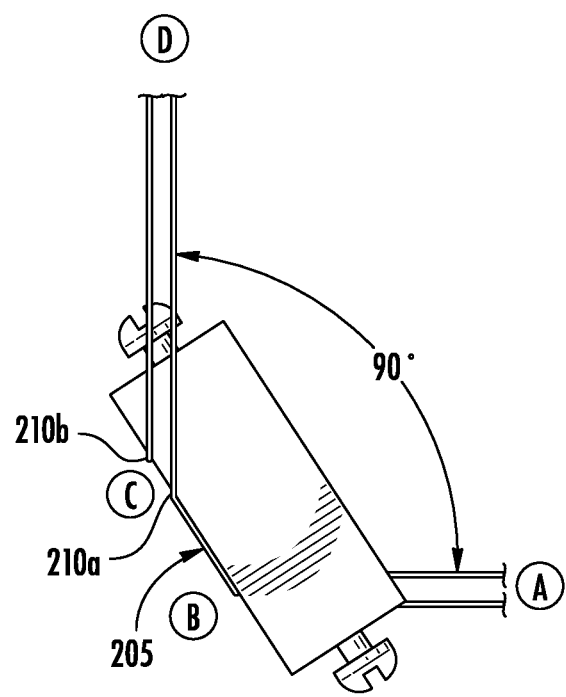
FIG. 13D is a top view of the support node of FIG. 13A in a third position.

FIG. 13A-13D illustrate a pivot node 205 for the dual wire assembly 100. The pivot node 205 can include at least one notch 210a, 210b for receiving a portion of the dual wire assembly 100. As shown in FIGS. 13A-13D, the pivot node 205 can at least one pair of notches 210a, 210b, 210c, 210d that are offset from each other. As shown in FIG. 13A, a first pair of notches 210a, 210b are defined on a common edge of the pivot node 205 and a second pair of notches 210c, 210d are defined on another common edge of the pivot node 205. The first pair of notches 210a, 210b are spaced apart from each other such that the wires 100a, 100b are secured at a predetermined spaced from each other. The second pair of notches 210c, 210d have a similar spacing. The first pair of notches 210a, 210b and the second pair of notches 210c, 210d can be arranged on different sides or edges of the pivot node 205, and can also be offset from other. A depth of each of the notches 210a, 210b, 210c, 210d is sufficient to receive the wires 100a, 100b. In one aspect, the depth of the notches 210a, 210b, 210c, 210d is such that the wires 100a, 100b can be completely recessed within the notches 210a, 210b, 210c, 210d. This configuration provides a different arrangement for receiving and spacing the wires 100a, 100b from each other as compared to the separator node 101, which is configured to completely enclose the wires 100a, 100b.

Based on this configuration, the dual wire assembly 100 can be wrapped around a portion of the pivot node 205 such that the dual wire assembly 100 can engage the pivot node 205 at one angle and disengage the pivot node 205 at a second angle that is different from the first angle. In one example, the dual wire assembly 100 can be routed or wrapped around the pivot node 205 at a 45-degree angle with a single turn or wrap around the pivot node 205. If the dual wire assembly 100 is wrapped around two edges or sides of the pivot node 205, then the dual wire assembly 100 can be redirected by a 90 degree angle based on engagement within the notches 210a, 210b. The difference in the angle between engagement and disengagement of the dual wire assembly 100 from the pivot node 205 can vary. The pivot node 205 can include at least one anchor 215a, 215b that is configured to engage a mounting or support element, such as a steel anchor wire. The pivot node 205 can be formed from fire proof or fire-resistant materials, such as silica cement. Various engagement points and paths A, B, C, D are shown in FIGS. 13A-13D. One of ordinary skill in the art would understand that various paths for the wires 100a, 100b could be provided based on the shape, position, and configuration of the notches 210a, 210b, 210c, 210d and the entrance and exit angles of the wires 100a, 100b. The pivot node 205 can be used to turn or redirect the wires 100a, 100b by 90 degrees in an upward direction, downward direction, lateral direction, or any other direction. One of ordinary skill in the art would understand that pivots of various angles or turns can be provided using similar techniques, so long as the wires remain taut and separated from each other.

FIG. 14 illustrates an arrangement for a dual wire assembly 100 connected to a RF interface assembly 150 at a first end, and an antenna 104 and an antenna support node 106 at a second end. At an intermediate region of the dual wire assembly 100, the pivot node 205 can be provided in order to redirect the dual wire assembly 100. The pivot node 205 can be mounted to a structure via a support 113 (such as an anchor wire), preferably formed from steel, that is connected to a support beam 115a in the structure, which is also preferably formed from steel. The pivot node 205 and its engagement with the dual wire assembly 100 also maintains proper separation between the dual wires 100a, 100b and assures the correct impedance for the transmission of RF signals. The antenna support node 106 can also be mounted in the structure via a support element 115b, which is preferably formed from steel and connected to a steel support beam. The pivot node 205 and the antenna support node 106 are each generally supported to fire resistant structures, e.g. steel beams, frames, etc., in order to ensure that the relevant components attached to these components remain in place in the event of a fire. The RF interface assembly 150 includes the RF connector 155, which is configured to attach to an RF cable 130, as shown in FIG. 14. One of ordinary skill in the art would understand that the RF cable 130 can also engage with the RF connectors 155 shown in the other Figures.

Figure 15:
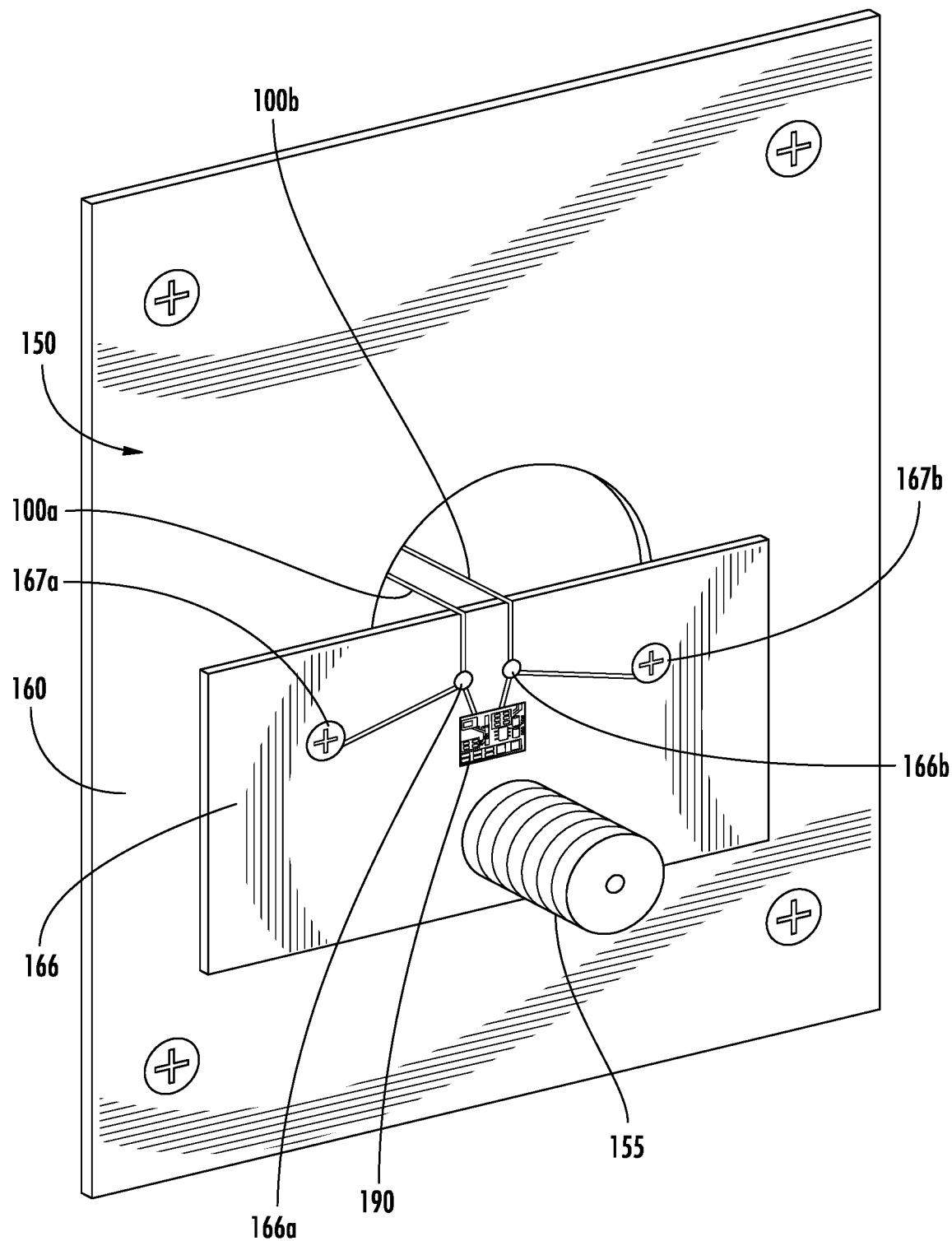
FIG. 15 is a perspective view of an RF interface assembly according to another example.

FIG. 15 illustrates another RF interface assembly 150 including an RF connector 155 mounted to a base plate 160. A printed circuit board 166 can be provided on the base plate 160 and the RF connector 155 can extend through the base plate 160. Pivots 166a, 166b can be provided on the printed circuit board 166. The pivots 166a, 166b can be configured to receive portions of the dual wire assembly 100, such that the wires 100a, 100b can wrap around the pivots 166a, 166b and attach to anchors 167a, 167b. The pivots 166a, 166b can also be configured as anchor points for the wires 100a, 100b. The pivots 166a, 166b can be configured to provide an electrical interface between the dual wire assembly 100 and the printed circuit board 166. Soldering or other means can be used for electrically connecting the wires 100a, 100b to the printed circuit board 166. The pivots 166a, 166b can be formed as a receptacle for receiving a portion of the dual wire assembly 100 or can be formed as soldered connection configured to engage the dual wire assembly 100. The anchors 167a, 167b can be configured to provide a physical connection for the dual wire assembly 100. The anchors 167a, 167b can be formed as screws, bolts, or other protrusions, retainers, or pockets which the wires 100a, 100b can be engaged with for tensioning. Tensioning of the dual wires 100a, 100b can be achieved by pulling the wires 100a, 100b around the anchors 167a, 167b, in one example. Tensioning of the dual wires 100a, 100b is necessary to ensure that the dual wires 100a, 100b maintain a uniform or consistent separation or spacing from each other. One of ordinary skill in the art would understand that various connections could be provided on the RF interface assembly 150 that are configured to provide electrical and/or physical connections between the dual wire assembly 100 and the printed circuit board 166. The connections between the dual wire assembly 100 and the printed circuit board 166 or the RF interface assembly 150 can be configured to avoid generation of any noise or interference. Each of the components shown in FIG. 15 can be encased or enclosed within an enclosure, such as the enclosure 165 of FIG. 9 to provide fire proof protection and the protect the components in the event of a fire.

FIG. 16 illustrates an exemplary splitter element 300 configured to have input of the first and second wires 100a, 100b and an output of two first wires 100a', 100a" and two second wires 100b', 100b". The splitter element 300 can include splitter circuitry 290 configured to split the signal of the input wires 100a, 100b into a signal for the output wires 100a', 100a", 100b', 100b". The splitter element 300 can include a body 306 that encloses portions of the wires and houses the splitter circuitry 290. The body 306 can be formed as an enclosure or block of material, such as silica cement or other fire-proof material. This ensures that the splitter element 300 can withstand fire or high temperatures and also protects the splitter circuitry 290.

FIG. 17 illustrates a schematic for the dual wire assembly that includes a plurality of splitters 300a, 300b, 300c and a tap 301. The splitters 300a, 300b, 300c can each be arranged along the dual wire assembly 100 at junctions or intersections that allow the dual wire assembly 100 to be connected to a plurality of antennas 204a, 204b, 204c, 204d, 204e. Each of the splitters 300a, 300b, 300c can include circuitry configured to split the dual wire assembly into at least two different paths or directions. Each of the splitters 300a, 300b, 300c can be configured to provide a 50% signal division. The tap 301 can be configured to provide 10% signal extraction, in one embodiment. Based on this configuration, a 33% signal extraction can be provided.

One of ordinary skill in the art would understand that the circuitry components installed in a living space and not in a fire protected room (i.e. structures that are fire rated for at least two hours of protection) must be protected from exposure to high temperatures. The types of circuitry used for the system disclosed herein can include circuitry configured for impedance conversion from 300 ohms to 50 ohms, signal splitters, and/or taps used to distribute signal throughout a facility. Conversion between the dual or twin wire assembly impedance to typical RF equipment impedance can be achieved in a variety of ways. In one embodiment, the signal can be split evenly from one wire of the dual wire assembly to two dual wire cables, which would require a 50% splitter. Half of the signal power is sent into one of the dual wire assemblies and the other half of the signal power is sent to the other one of the dual wire assemblies. Additionally, signal taps can be implemented to perform uneven or unequal splitting of the signal. For example, in in certain circumstances, there may be a need for only 10% of the signal in one pathway or wire and 90% of the signal in another pathway or wire. One of ordinary skill in the art would understand that the tap percentage levels can vary. Another example includes the use of a balun circuit to convert impedances from a balanced line, such as the dual wire assembly, to an unbalanced line, which is used in conventional RF systems.

One feature to implement the circuitry so as to protect it from the extreme heat and fire in the application is to encapsulate it in silica cement. The thickness of the protection around the circuitry can be controlled such that it will properly insulate it from the extreme temperatures and assure the circuitry survives fire and extreme temperatures.

Another feature for protecting the circuitry includes using electrical components and circuit boards that are specifically configured to withstand heat. These high temperature components could include printed circuit boards that include ceramic elements. Embedding the components in silica cement or other fire proof material could also be used in conjunction with the use of specifically designed high temperature electrical components. In an alternative configuration, wire-wound components can be used to avoid the use of circuit boards.

Some components can be wire-wound together to avoid the use of a solder connection. Another feature can include positioning the soldered components in a well so that if the solder were to melt under extreme temperatures, it would be contained within the well. Once the temperature dropped, the solder can re-form or solidify at the contact point and maintain the electrical connectivity.

Another feature can include installing or building the circuitry inside a double walled sheetrock enclosure, which will also protect the circuitry from the high heat exposure.

Based on the disclosed configurations herein, the present system provides a reliable communications and signal transmission system that is configured to withstand high temperatures and/or fires. Specifically, the system disclosed herein can include various components, such as wires, baluns, splitters, taps, antennas, etc., that are formed from materials configured to withstand high temperatures, such as steel, copper coated steel, or metallic alloys, and/or embedded within protective enclosures or elements that are formed from materials configured to withstand high temperatures, such as silica cement.

The system disclosed herein provides an improved and reliable communications system that is configured for use in fires. The system provides an interface between a balanced communication channel from the dual wire assembly 100 to an unbalanced communication channel (i.e. the communications equipment).

Having thus described the present disclosure in detail, it is to be appreciated and will be apparent to those skilled in the art that many physical changes, only a few of which are exemplified in the detailed description of the invention, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

What is claimed is:

1. A radio frequency (RF) wire system comprising:
   a dual wire assembly including a first wire and a second wire, the first and second wires being formed from at least one of copper, steel, copper coated steel, or metallic alloy,
   the dual wire assembly being configured to transmit radio frequency signals, and
   the first wire and the second wire are spaced apart from each other by a predetermined distance.

2. The system according to claim 1, further comprising at least one separator node configured to separate the first wire and the second wire by the predetermined distance, wherein the at least one separator node is formed from at least one of furnace concrete, low coefficient of expansion glass, or silica cement.

3. The system according to claim 1, wherein a first end of the dual wire assembly is configured to be connected to at least one at least one antenna, and a second end of the dual wire assembly is configured to be connected to communication equipment.

4. The system according to claim 1, further comprising at least one pivot node including at least one anchor configured to secure the at least one pivot node to a support structure, wherein the at least one pivot node includes at least one notch configured to guide a portion of the dual wire assembly.

5. The system according to claim 4, wherein the at least one pivot node includes two anchors on opposite sides of the at least one pivot node.

6. The system according to claim 4, wherein the at least one anchor includes at least one of a tension spring, a turnbuckle, or a hook.

7. The system according to claim 4, wherein the at least one notch includes a first pair of notches on a first edge of the at least one pivot node, and a second pair of notches on a second edge of the at least one pivot node.

8. The system according to claim 7, wherein the notches of the first pair of notches are spaced apart from each other by the predetermined distance, and the notches of the second pair of notches are spaced apart from each other by the predetermined distance, wherein the first pair of notches, and the second pair of notches are offset from each other.

9. The system according to claim 1, further comprising at least one antenna formed from copper coated steel or steel.

10. The system according to claim 9, wherein the at least one antenna is formed as a folded dipole antenna.

11. The system according to claim 9, wherein the at least one antenna is configured to be connected to a structural support beam via an antenna support node.

12. The system according to claim 11, wherein the antenna support node comprises an enclosure including silica cement.

13. The system according to claim 12, further comprising RF interface equipment arranged between the dual wire assembly and the at least one antenna, wherein the RF interface equipment is configured to balance an impedance differential between the dual wire assembly and the at least one antenna.

14. The system according to claim 13, wherein the RF interface equipment is embedded in silica cement.

15. The system according to claim 1, further comprising a wire wrap encapsulating the dual wire assembly, the wire wrap having a thickness that is configured to provide a predetermined spacing from external metal objects.

16. The system according to claim 1, wherein the system provides a transmission medium via the dual wire assembly having a 300-ohm impedance.

17. The system according to claim 1, wherein the first and second wires are each a 24-gauge wire and an air dielectric is provided between the first and second wires.

18. The system according to claim 1, wherein the predetermined distance is at least 2.50 mm and no greater than 2.75 mm.

19. The system according to claim 1, further comprising an RF interface assembly configured to be connected to an end of the dual wire assembly, wherein the RF interface assembly comprises an enclosure formed from silica cement, and the RF interface assembly further comprises circuitry configured to convert a first impedance value of the dual wire assembly to a second impedance value.

20. The system according to claim 19, wherein the RF interface assembly further comprises anchors configured to secure the first and second wires to the RF interface assembly.

* * * * *